P. E. COLLINS.
Cotton Gin.
No. 25,630.
Patented Oct. 4, 1859.
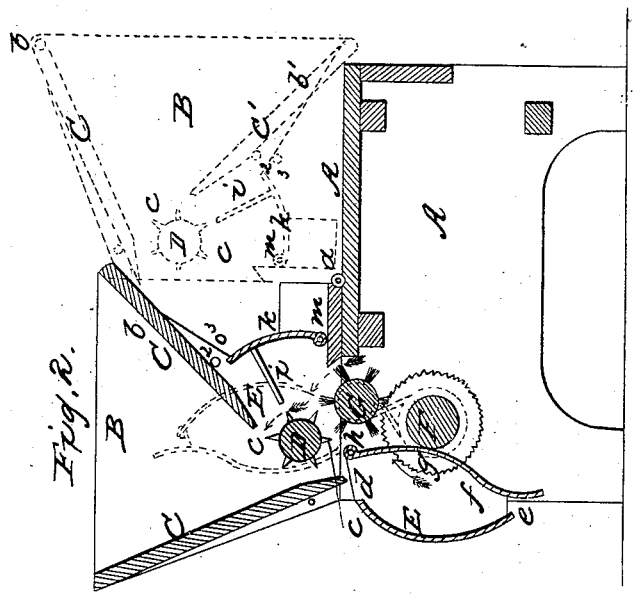
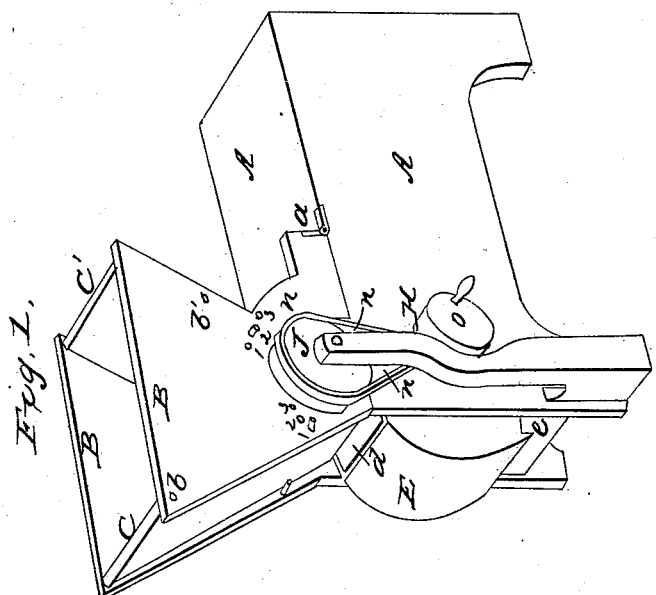
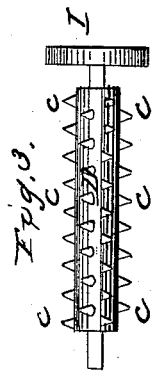
Witnesses
A.B. Stoughton
E. Cohen
Inventor:
P. E. Collins

UNITED STATES PATENT OFFICE.

POWHATTAN ELLIS COLLINS, OF MOBILE, ALABAMA.

IMPROVEMENT IN COTTON-GINS.

Specification forming part of Letters Patent No. 25,630, dated October 4, 1859.

*To all whom it may concern:*

Be it known that I, POWHATTAN E. COLLINS, of Mobile, in the county of Mobile and State of Alabama, have invented certain new and useful Improvements in Cotton-Gins; and I do hereby declare the following to be a full, clear, and exact description of the construction and operation of the same, reference being had to the accompanying drawings, making a part of this specification, in which—

Figure 1 represents a perspective view of the machine. Fig. 2 represents a vertical longitudinal section through the same. Fig. 3 represents the toothed feeding-cylinder detached.

Similar letters of reference, where they occur in the separate figures, denote like parts of the machine in all of them.

My invention relates to the feeding of the cotton from the hopper to the ginning or cleaning apparatus, so that the latter cannot be overloaded or clogged.

I am aware that hoppers with slatted or ribbed bottoms have been used in connection with a feeding-cylinder, and that in some cases the hoppers have been hinged so as to be raised or lowered from and to the cylinder to regulate the feed. These arrangements, though long known, are not used, having been found impracticable for the purposes designed.

To enable those skilled in the art to make and use my invention, I will proceed to describe the same with reference to the drawings.

A represents the gin-frame, to which the end pieces, B B, of the hopper are hinged at the points $a$ $a$.

C C' are the side pieces of the hopper. They are hinged to the end pieces, B, at $b$ $b'$, respectively, and approach each other at their lower ends, the one, C, extending farther down than the other, as seen in Fig. 2. A series of adjusting-holes, 1 2 3 &c., are made in the ends of the hopper, through which a pin may be inserted to hold the hinged side pieces, C C', in such position with regard to the feeding-cylinder D as will allow it to take only so much cotton from the hopper as the gin is capable of working advantageously. The cylinder D occupies nearly a central position in the bottom of the hopper, and is furnished with lozenge-shaped teeth $c$ $c$, tapering from their base to their points, so that they have a retractive property in leaving the cotton, and thus in a manner work the cotton without tearing or dragging it or retaining it so as to become clogged while they carry the cotton out of the hopper and deliver it into the receptacle E (where it is acted upon by the saws of the saw-cylinder F in the usual manner) without the use of slats or ribs.

The receptacle E may be made of sheet metal. It is open on top, as at $d$, so that the dust may escape, and also open at the bottom, as at $e$, that the seeds may drop through when divested of their fiber. Its side next the saw-cylinder F is composed of a series of ribs, $f$, through which the saws $g$ project to catch the cotton in the usual manner. The receptacle or trunk E is hinged to the main frame at the points $h$, so that it may be swung up out of the way (as shown in red lines in Fig. 2) for cleaning the saw-cylinder. The hopper and its several connected parts can also be swung back out of the way, as shown in said Fig. 2 in red lines.

G is a brush-cylinder. It may be hung so that it will clean both the saw-cylinder F and the feeding-cylinder D, though the latter will not generally require such cleaning. Behind the feeding-cylinder D there is a comb, $i$, which is so arranged and inclined as to catch and deliver onto the feed-cylinder any cotton that may get behind the hinged side C', and in rear of this comb there is a shield, $k$, pivoted at $m$, so that it may also be swung back to get at the comb or brush cylinder, and thus every operative part of the machine can be got at in a moment for cleansing or repairs. The cylinders run in the directions noted by the arrows. Motion may be communicated to them from any first moving power by an endless belt encircling the pulley H on the journal of the saw-cylinder, and from another pulley on the saw-cylinder a twisted belt, $n$, may pass over a pulley, I, on the feeding-cylinder D to operate it.

J is a loose pulley, onto which the belt $n$ may be shipped when it becomes necessary to swing back the hopper, the drawing showing the belt so shipped. The brush-cylinder may receive its motion from a twisted belt on the other side of the machine, as seen in dotted lines in Fig. 2, which encircles a pulley on the saw-cylinder, and one on the said brush-cylinder. A suitable catch is also provided to hold the hopper in place when the machine is operating. The side C of the hopper may be adjusted to the cylinder, so as to properly regulate the feed of cotton; but, as often happens, should the feed become clogged or disarranged, the pin that holds up said side C is withdrawn, and the whole hopper is instantly emptied of its cotton. In some conditions of the staple the side C' must do the regulating. Its tendency is to expose more or less of the staple to the feeding-cylinder as its lower end swings over said roller. Sometimes both the sides must be adjusted. One regulates the quantity of staple that the feeding-cylinder may take from the hopper; the other regulates the quantity it may carry out and deliver into the trunk E, and thus no slatted bottom is required.

Having thus fully described the nature and object of my invention, what I claim therein as new, and desire to secure by Letters Patent, is—

1. An adjustable hopper, as described, for changing and regulating the feed of cotton to a gin, as set forth.

2. In combination with an adjustable and regulating hopper, the toothed cylinder D, for conveying the cotton from the hopper to the ginning or saw cylinder, as herein set forth.

3. The arrangement of the hopper feeding toothed roller, saw, and brush cylinders, as shown, so as to operate in connection with each other in the manner described.

P. E. COLLINS.

Witnesses:
A. B. STOUGHTON,
E. COHEN.